United States Patent [19]

Skrivseth

[11] 4,099,513

[45] Jul. 11, 1978

[54] SOLAR HEATING COLLECTOR

[75] Inventor: Robert K. Skrivseth, Whitewater, Wis.

[73] Assignee: SolaRay, Inc., Whitewater, Wis.

[21] Appl. No.: 773,801

[22] Filed: Mar. 3, 1977

[51] Int. Cl.² .............................................. F24J 3/02
[52] U.S. Cl. .................................... 126/270; 126/271
[58] Field of Search ............... 126/270, 271; 237/1 A

[56] References Cited

U.S. PATENT DOCUMENTS

| 2,680,437 | 6/1954 | Miller | 126/270 |
| 4,019,494 | 4/1977 | Safdari | 126/270 |
| 4,046,133 | 9/1977 | Cook | 126/271 |
| 4,050,443 | 9/1977 | Peck et al. | 126/270 |

*Primary Examiner*—Kenneth W. Sprague
*Attorney, Agent, or Firm*—Merriam, Marshall & Bicknell

[57] ABSTRACT

An air solar heating collector assembly is provided having a framework covered by a back plate and a transparent front cover with a thin metal absorber plate mounted centrally therebetween. Baffle members are mounted on both surfaces of the absorber plate and are arranged for alternately splitting and recombining the air flow along both surfaces of the absorber plate. The back plate has air inlet means at one end of the assembly and air outlet means at the other end of the assembly arranged so that the air is admitted simultaneously to and discharged simultaneously from the passages at both sides of the absorber plate. The baffle arrangement is complementary on opposite sides of the absorber plate so that in each region where splitting of the air flow occurs at one side of the plate, recombining of air flow occurs in the corresponding region at the opposite side of the plate.

9 Claims, 6 Drawing Figures

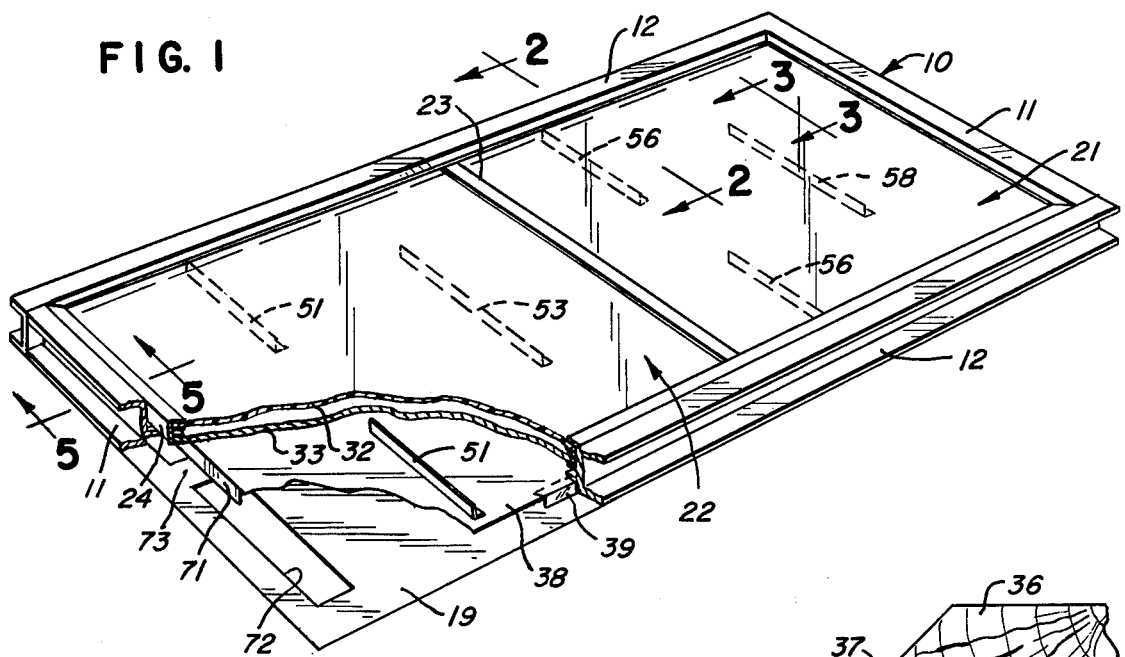
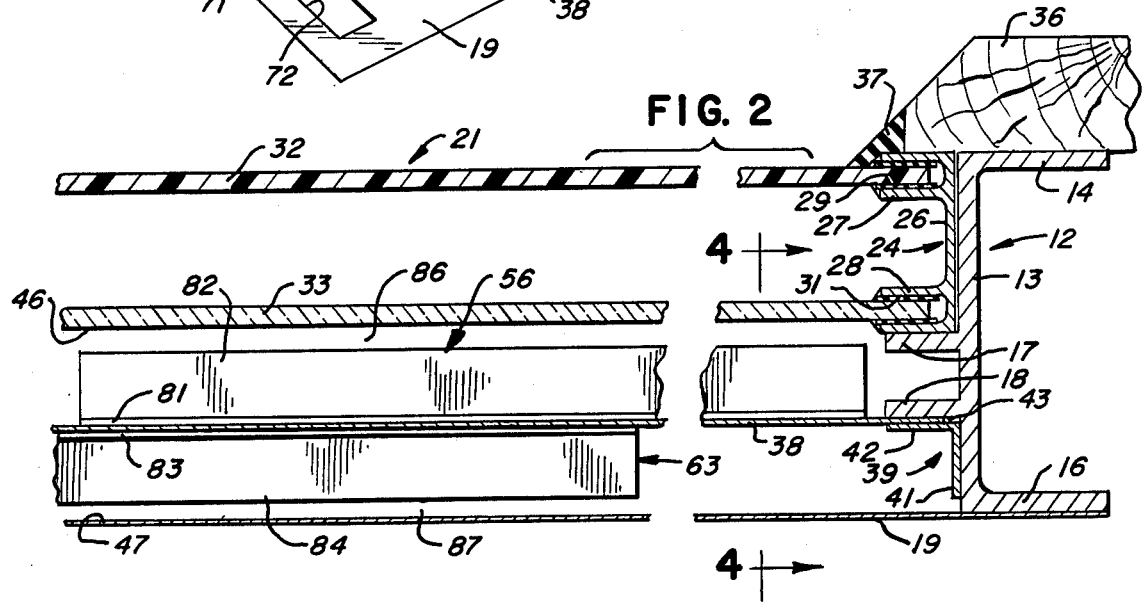
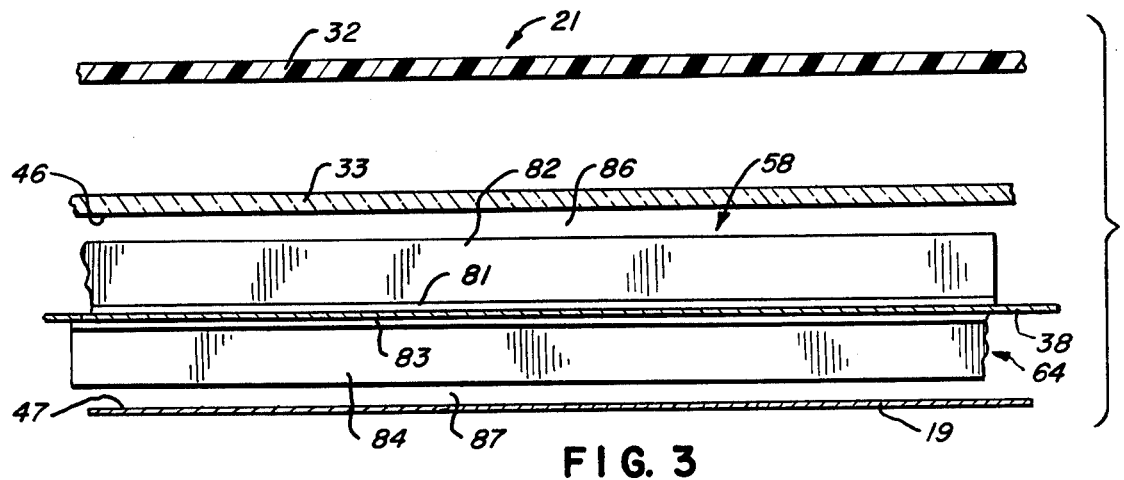

SOLAR HEATING COLLECTOR

This invention relates to a novel and improved flat plate collector for heating circulating air in a solar heating system.

A flat plate solar energy collector is essentially a heat exchanger with one difference. In addition to exchanging thermal energy from one medium to another, it also converts radiant energy in the visible light spectrum into thermal energy. The conversion of radiant energy is usually done with a thin coating of material that has a high absorbtance ratio ($\alpha$). The rate at which the solar energy is converted to thermal energy is a function of the sun's insolation (I) and the absorbtance ratio ($\alpha$). This is true for all bodies that are warmed by solar radiation ($Q_a = I\alpha$). Portions of the insolation are reflected ($\rho$) as light radiation and also emitted ($\epsilon$) from the surface as infrared radiation in such proportions that $\alpha + \epsilon + \rho = 1$.

The objective of the solar collector then is to retain and transport as much of the insolation as possible in the form of useful energy. Factors causing the reduction of this useful energy are limitations on the rate at which the absorbed energy may be transferred to the working medium and the loss of energy due to the fact that the whole body is raised to a temperature higher than the ambient temperature.

Thus, it is desirable to provide in the solar collector a short and effective flow path for conducting thermal energy from the absorption surface to the working medium. It is also known that most efficient transfer of heat from a hot surface to a moving air stream is obtained when the air is turbulent. The present invention provides a solar collector which meets both of these design criteria in a simple, unique, and inexpensive manner.

Accordingly, one object of the invention is to provide a novel air solar heating collector assembly having a short and rapid path for conducting thermal energy to the air.

A further object of the invention is to provide an air solar heating collector assembly having a unique and highly efficient air flow arrangement which contributes to effective performance of the collector.

An additional object of the invention is to provide an air solar heating collector assembly having the aforementioned characteristics and which is also simple in construction and economical to manufacture.

Other objects and advantages of the invention will be apparent from the following detailed description in connection with the accompanying drawings, wherein:

FIG. 1 is a perspective view of a collector assembly comprising one specific embodiment of the invention, with portions broken away;

FIG. 2 is a fragmentary transverse sectional view on an enlarged scale, as seen along the line 2—2 of FIG. 1;

FIG. 3 is a fragmentary transverse sectional view on an enlarged scale, as seen along the line 3—3 of FIG. 1;

Figure 5:
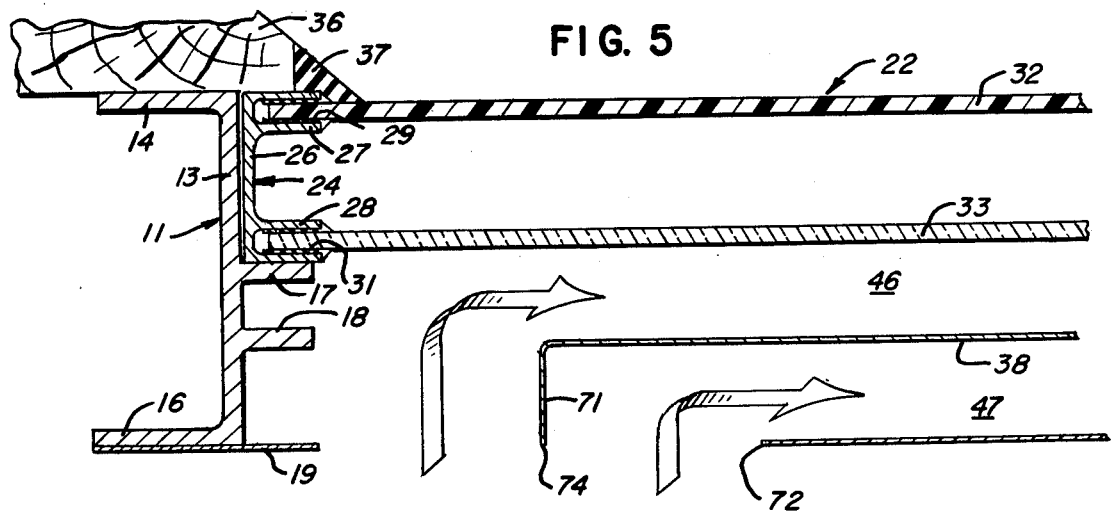
FIG. 5 is a fragmentary longitudinal sectional view on an enlarged scale, as seen along the line 5—5 of FIG. 1.

Referring to the drawings, an air solar heating collector assembly is illustrated which comprises one specific and preferred embodiment of the invention. As seen in FIG. 1, the assembly has an elongated rectangular metal framework designated generally at 16. 10. In this instance, the framework is made up of a pair of transversely extending end portions 11 an a pair of elongated side portions 12, the end portions and side portions being secured together at the corners of the framework to provide a rigid unitary assembly. Preferably, the end portions 11 and the side portions 12 of the framework are extruded aluminum members having the cross-sectional configuration shown in FIGS. 2 and 5. Thus, the extrusion has an upstanding web portion 13, an upper outwardly extending flange position portion 14, and a lower outwardly extending flange portion 6. The opposite side of the web portion 13 is provided with a pair of spaced inwardly extending flange portions 17 and 18.

The open framework 10 is covered at its back by a rectangular support plate 19, which may conveniently be a thin aluminum sheet. The support plate 19 is seated flatwise against the under surfaces of the lower flange portions 16 of the framework and is permanently secured thereto around the entire periphery of the framework, as by rivets or the like (not shown). Preferably, a suitable sealant is interposed between the plate 19 and the flange portions 16 to prevent leakage of air from the interior of the assembly. When the collector assembly is mounted on the roof of a building or the like, the support plate 19 engages the roof surface. If desired, the support plate 19 may also be mounted on a rectangular plywood pallet or base (not shown).

At the front of the framework 10 a suitable transparent cover is provided which is exposed to the rays of the sun. For convenience, the cover is preferably made in two or more parts to facilitate handling, assembly, and maintainance. In the illustrated embodiment of the invention, two such cover sub-assemblies 21 and 22 are supported on the framework 10 in spaced relation from the support plate 19 to form an enclosure. A metal strip 23 is removably secured between the side portions 12 overlying the juncture between the cover sub-assemblies 21 and 22 for sealing and retaining purposes. In the case of a longer collector assembly, the transparent cover at the front of the framework may be formed from three such cover sub-assemblies.

As seen in FIGS. 2 and 5, the cover sub-assemblies 21 and 22 have a peripheral metal framework such as the extruded aluminum channel member 24 having a web portion 26, an upper flange portion 27, and a lower flange portion 28. The flange portions 27 and 28 have lateral recesses 29 and 31, respectively, for receiving outer and inner transparent cover members 32 and 33, respectively. The peripheral edges of the cover members 32 and 33 are permanently sealed in the recesses 29 and 31 by means of a suitable sealant so as to form a unitary sub-assembly. Preferably, the outer cover member 32 is a non-fragile plastic material such as an acrylic plastic, and the inner cover member 33 is glass. Each of the cover sub-assemblies 21 and 22 is removably supported on the flanges 17 in recessed relation within the framework 10, and the slight clearance between the web portions 13 of the framework 10 and the web portions 26 of the cover sub-assembly framework may be sealed, if desired, with a suitable caulking compound (not shown). As will be evident from FIGS. 2 and 5, the vertical height of the cover framework 24 is the same as the distance between the flange 17 and the outer surface of the flange 14 so that the upper flanged surfaces of the cover framework and the main framework are substantially flush. For retaining the cover sub-assemblies in place and for decorative purposes, wood cover strips 36 may be secured by screws or the like (not shown) to the upper flanges 14 around the entire periphery of the collector assembly, the cover strips 36 overlapping the cover sub-assemblies 21 and 22 to retain the latter in place. A bead of caulking compound 37 may be disposed between the wood cover strips 36 and the cover sub-assemblies 21 and 22 for sealing purposes.

Within the enclosure provided by the framework 10, the cover sub-assemblies 21–22, and the support plate 19, the operative portion of the collector assembly is provided in the form of a rectangular absorber plate 38 which is a thin metallic sheet such as aluminum. The absorber plate 38 is supported centrally between and in parallel relation with the inner cover members 33 and the support plate 19 by suitable retaining means which, in the illustrated embodiment, comprises elongated supporting angles 39 secured to the side portions 12 of the framework 10. Thus, as seen in FIG. 2, the support angle 39 has a depending leg portion 41 rigidly secured to the web portion 13 by rivets or the like (not shown) and an inwardly extending leg portion 42 in spaced parallel relation below the inwardly extending flange portion 18. The distance between the leg portion 42 and the flange portion 18 is slightly greater than the thickness of the absorber plate 38 so that the longitudinal side edges of the plate 38 are relatively loosely received between the angle leg 42 and the flange 18. In addition, clearance space, indicated at 43, is provided between each of the longitudinal edges of the absorber plate 38 and the side portions 12. The combination of this clearance 43 and the loose fit of the absorber plate 38 between the support angle 39 and the flange 18 allows the absorber plate 38 to expand and contract freely in the plane of the plate as its temperature changes during operation, thereby preventing the absorber plate from buckling or exerting any stress on the rest of the collector assembly.

The absorber plate 38 is formed of light gauge sheet metal, preferably aluminum, and the upper or front surface of the plate 38 has a selective or non-selective absorption coating, such as a flat black paint, so that the sun's radiant energy passing through the transparent cover sub-assemblies 21 and 22 impinges on the coated surface of the absorber plate 38 and is converted into thermal energy. The absorber plate 38 effectively divides the enclosure within the collector assembly into a pair of elongated parallel compartments or passages. One such passage is defined between the upper or coated side of the plate 38 and the transparent cover member 33 and is designated by the reference numeral 46. The other compartment or passage is defined between the underside of the plate 38 and the support plate 19 and is designated by the reference numeral 47.

Figure 6:
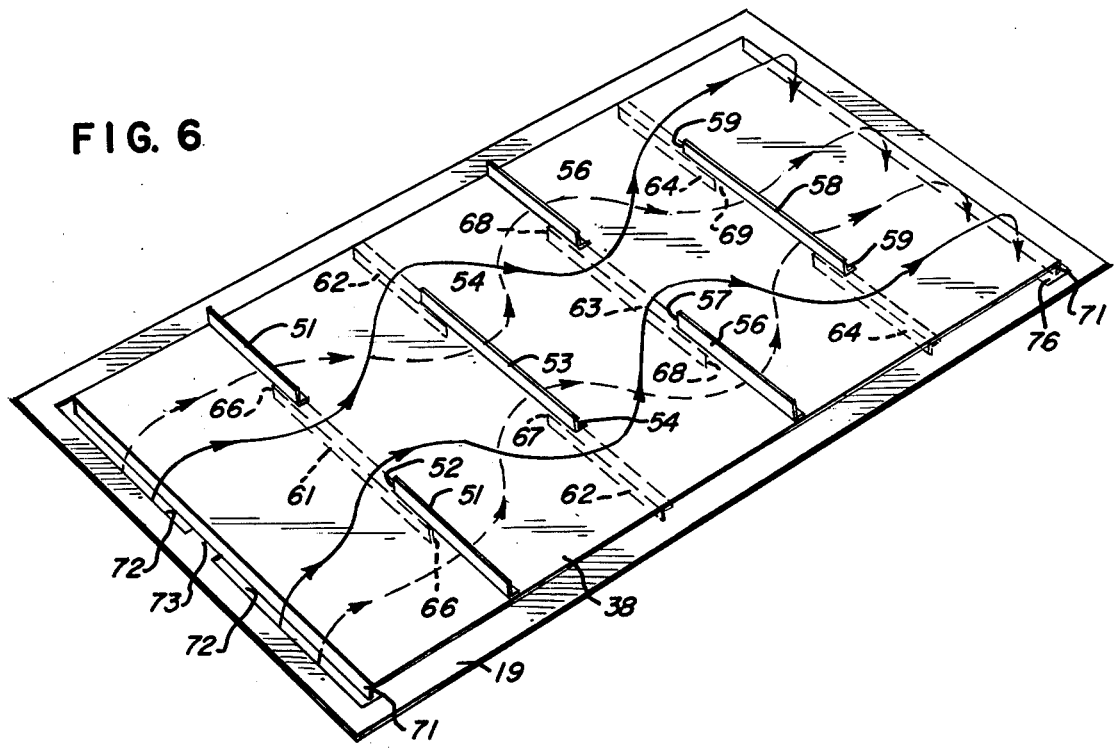
FIG. 6 is a perspective view of the internal portions of the collector assembly with a schematic representation of the air flow paths through the collector assembly.

Suitable baffle members are secured to both sides of the plate 38 and extend perpendicularly to the plate into the passages 46 and 47 so as to direct the flow of air over both sides of the absorber plate in a generally serpentine fashion, as more fully described hereinafter in conjunction with FIG. 6. As seen in FIG. 6, a pair of baffle members 51 are disposed in longitudinal alignment across the width of the collector assembly and extend inwardly from closely adjacent the opposite side portions 12 of the framework 10 with the inner ends of the baffle members 51 terminating to define an enlarged central opening 52. Another baffle member 53 is disposed in spaced parallel relation from the baffle members 51 and is mounted centrally between the side edges of the absorber plate 38 to define a pair of openings 54 between the ends of the baffle member 53 and the side portions 12 of the framework. Another pair of spaced baffle members 56, similar to the baffle members 51, are secured to the plate 38 in spaced parallel relation from the baffle member 53, and a central opening 57 is defined between the inner ends of the baffle members 56. Another centrally located baffle member 58, similar to the baffle member 53, is mounted on the plate 38 in spaced parallel relation from the baffle members 56 and defines a pair of spaced openings 59 between the ends of the baffle member 58 and the side portions 12 of the framework. A similar set of baffle members 61, 62, 63, and 64 are secured to the underside of the plate 38 within the air passage 47, and these baffle members define air openings 66, 67, 68, and 69, respectively.

As shown in FIG. 6, the baffle members 51-53-56-58 in the air passage 46 are arranged in complementary relation to the baffle members 61-62-63-64 in the air passage 47. Thus, the pairs of spaced baffle members 51 and 56 at one side of the absorber plate 38 are complemented by the single centrally disposed baffle members 61 and 63, respectively, at the other side of the absorber plate 38. Similarly, the single centrally disposed baffle members 53 and 58 at one side of the absorber plate are complemented by the spaced pairs of baffle members 62 and 64 at the other side of the absorber plate. Furthermore, it is to be noted that each complementary group of three baffle members is in longitudinal alignment, i.e. the innermost end portions of each pair of spaced baffle members at one side of the absorber plate longitudinally overlap the outermost end portions of the centrally disposed baffle member at the opposite side of the absorber plate. For example, the innermost end portions of the baffle members 51 overlap the outermost end portions of the baffle member 61, and the same relationship exists for baffle members 53 and 62, 56 and 63, and 58 and 64. This overlapping aligned relationship provides structural continuity of the baffle members transversely of the absorber plate 38, thereby stiffening and structurally strengthening the latter.

Figure 4:
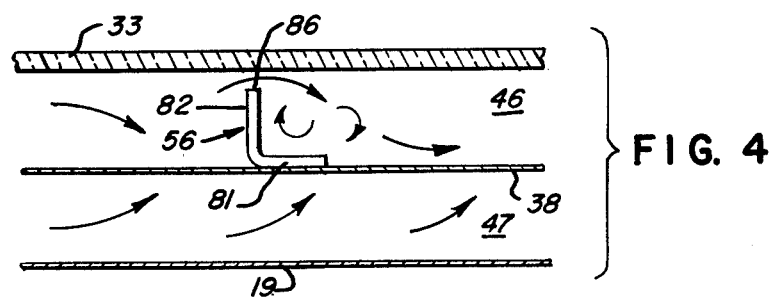
FIG. 4 is a fragmentary longitudinal sectional view as seen along the line 4—4 of FIG. 2.

As illustrated in FIGS. 2, 3 and 4, each of the baffle members heretofore described is preferably in the form of an elongated angle member having one leg portion in flatwise engagement with a surface of the absorber plate 38 and the other leg portion extending perpendicularly into the corresponding air passage 46 or 47. Thus, in FIG. 2 the baffle member 56 has a leg portion 81 engaging the upper coated surface of the absorber plate 38 and secured thereto by rivets or the like (not shown) and an upright leg portion 82 extending toward the cover member 33. Similarly, in the air passage 47 the baffle member 63 has a leg portion 83 secured to the absorber plate 38 and a leg portion 84 extending toward the support plate 19. The overlapping portions of the baffle members 56 and 63 may be secured to the absorber plate 38 by a single set of fastening elements extending through the leg portions 81 and 83 and also the absorber plate 38. As will be evident from FIGS. 2 and 4, the outer longitudinal edges of the leg portions 82 and 84 are spaced slightly from the cover member 33 and the support plate 19, respectively, to provide elongated narrow clearances 86 and 87, respectively. As illustrated schematically in FIG. 4, the clearance 86 between the baffle member 56 and the cover member 33 permits a small amount of the air flow to bypass the central opening 57 and to flow over the top of the baffle members 56, thereby creating additional turbulence at the downstream side of the baffle member so as to avoid relatively stagnant pockets of air. This feature further contributes to the effective performance and efficient heat transfer realized by the collector assembly.

Referring to FIGS. 5 and 6, it will be seen that the opposite ends of the absorber plate 38 terminate in spaced relation from the end portions 11 of the framework 10. Preferably, the marginal end edges of the absorber plate 38 are bent perpendicularly to the plane of the absorber plate toward the plate 19, as designated at 71. These bent end portions 71 act as stiffening flanges for the absorber plate and also as baffles for directing the flow of air in the manner hereinafter described. For admitting cool air to the collector assembly, the support plate 19 is provided with an elongated inlet aperture which in this instance is in the form of a pair of slots 72 separated by an unremoved portion 73 of the support plate. The terminal edge, designated at 74 in FIG. 5, of the flange portion 71 preferably engages the portion 73 of the support plate, and the edge 74 is also preferably located at the center of the width of the slots 72 so that incoming air flows substantially equally into the air passages 46 and 47. A similar arrangement is provided at the opposite end of the collector assembly, the support plate 19 having a pair of outlet slots 76 separated by an unremoved portion of the support plate (not shown), and the flange portion 71 at that end of the collector assembly functions in a similar manner to direct the effluent heated air simultaneously from the passages 46 and 47 through the slots 76. It will be understood that suitable duct work communicates with the inlet slots 72 and outlet slots 76 to direct heated air from the collector assembly to a space to be heated or to a suitable storage medium, and the return cool air from the latter to the collector assembly.

By means of the baffle arrangement described above, it will be seen that the air flow through each of the passages 46 and 47 is alternatively split and recombined several times during its travel from the inlets 72 to the outlets 76. Thus, at the top side of the absorber panel 38 as seen in FIG. 6, the inlet air flows first through the central opening 52 between the baffle members 51, is then split into two streams as it flows through the openings 54 around the ends of the baffle member 53, is then recombined as it flows through the central opening 57 between the baffle members 56, and is finally split again into two streams as it flows through the openings 59 around the ends of the baffle member 58 and thence to the outlets 76. As also seen in FIG. 6, at the underside of the absorber plate 38, a complementary flow relationship exists whereby the inlet air from the slots 72 is initially split into two streams as it flows through the openings 66 around the ends of the baffle member 61, is then recombined as it flows through the central opening 67 between the baffle members 62, is again splite into two streams as it flows through the openings 68 around the ends of the baffle member 63, and is finally recombined by flowing through the central opening 69 between the baffle members 64 and thence to the outlet slots 76. As illusrated by the solid and broken arrows in FIG. 6, th air flow has a generally serpentine configuration, and the flow patterns are of opposite hand at the opposite sides of the absorber plate 38. In this way, highly effective and uniform transfer of heat from the absorber panel 38 to the air streams is accomplished and any tendency toward localized variations in temperature of the panel is minimized because of the counteracting flow distributions at the opposite sides of the absorber plate.

The collector assembly herein described has a highly effective performance because the air flowing through the passage 46 is in direct contact with the entire coated or solar energy absorbing surface of the absorber plate 38, and the thinness of the absorber plate 38 provides an extremely short path for heat to be conducted to the air stream flowing through the passage 47 at the opposite side of the plate. For example, an aluminum sheet of 0.032 inch thickness is quite effective as the absorber plate 38 and provides minimum resistance to heat flow. Also, as pointed out initially, it is desirable for most efficient heat transfer to have turbulent flow conditions in the air passages 46 and 47, as distinguished from laminar flow. For flow of air between two flat plates, the existence of turbulent flow will be determined by the linear velocity and the dimensions of the passages. In general, a minimum flow rate of 150 cubic feet per minute, and preferably at least about 200 cubic feet per minute, is desirable, and the dimensions of the passages and the baffle arrangement are selected so that the Reynolds number in the system exceeds the critical Reynolds number thereby resulting in turbulent flow. The critical Reynolds number corresponds to the transition from laminar flow to turbulent flow as the velocity is increased. For purposes of the present invention, the Reynolds number of the system should be 10,000 or greater so as to insure that the system is beyond the laminar flow range, i.e. in the transient or turbulent range.

Although the invention has been described with particular reference to the illustrated embodiment, it is to be understood that various modifications may be made without departing from the scope of the invention as defined in the appended claims.

I claim:
1. An air solar heating collector assembly, comprising
   a rectangular framework having oppositely spaced end portions and oppositely spaced side portions,
   a support plate fastened to and covering the back of said framework,
   transparent cover means removably supported on and covering the front of said framework,
   a solar energy absorber plate supported within said framework in parallel spaced relation between said support plate and said cover means, thereby defining a first air passage between said cover means and one surface of said absorber plate and a second parallel air passage between said support plate and the opposite surface of said absorber plate,
   air inlet means adjacent one end portion of said framework for admitting cool air through said support plate to flow simultaneously across the opposite surfaces of said absorber plate through said first and second air passages,
   air outlet means adjacent the opposite end portion of said framework for discharging heatred air simultaneously from said passages through said support plate, and
   baffle means comprising a plurality of baffle members secured in spaced parallel relation to the opposite surfaces of said absorber plate in said first and second air passages, sand baffle members being arranged so that the air flow through each of said passages is alternatively split and recombined dur- ing its travel from said inlet means to said outlet means.

2. The assembly of claim 1 further characterized in that said baffle means comprises a first set of baffle members secured in spaced parallel relation to said one surface of said absorber plate in said first air passage for alternately splitting and recombining the air flow through said first air passage, and a second set of baffle members secured in spaced parallel relation to said opposite surface of said absorber plate in said second air passage for alternately splitting and recombining the air flow through said second air passage, said first and second sets of baffle members being arranged in complementary relation so that for each location in said first air passage where splitting of the air flow is effected at said one surface of said absorber plate, recombining of the air flow is effected in the parallel location in said second air passage at said opposite surface of said absorber plate, and vice versa.

3. The assembly of claim 2 further characterized in that certain of said baffle members in each set are disposed centrally of said absorber plate with their ends spaced from said side portions of said framework for spliting the air flow as it passes through the pair of openings defined between the ends of the centrally disposed baffle members and said side portions, and others of said baffle members in each set are disposed in longitudinally aligned pairs extending inwardly from said side portions of said framework and terminating in spaced relation for recombining the split air stream at it passes through the single central opening defined between the spaced inner ends of said other baffle members.

4. The assembly of claim 3 further characterized in that each of said centrally disposed baffle members at one surface of said absorber plate has its opposite end portions longitudinally overlapping the inner end portions of an aligned pair of spaced baffle members at the opposite surface of said absorber plate so as to provide structural continuity of the baffle members between said side portions of said framework and thereby stiffening said absorber plate.

5. The assembly of claim 2 further characterized in that each of said baffle members is an elongated angle member having one leg portion secured to a surface of said absorber plate and the other leg portion extending into one of said air passages substantially perpendicularly to the plane of said absorber plate.

6. The assembly of claim 5 further characterized in that said other leg portion of each of said baffle members has its outer longitudinal edge spaced slightly from the opposing surface of said cover means or said support plate, whereby to permit limited bypass flow of air over said outer longitudinal edge and thereby preventing stagnation of air at the downstream side of the baffle member.

7. The assembly of claim 1 further characterized in that said framework includes a pair of spaced flange portions extending laterally inwardly from said side portions and said end portions, said transparent cover means being supported on one of said flange portions in recessed relation within said framework, and retaining means secured to said side portions of said framework in spaced relation below the other of said flange portions, said absorber plate being loosely received in the spaces between said retaining means and said other flange portion and being spaced slightly from said side portions of said framework, whereby to accommodate expansion and contraction of said absorber plate.

8. The assembly of claim 1 further characterized in that said absorber plate has opposite ends spaced from said end portions of said framework, said air inlet means comprises inlet aperture means in said support plate adjacent one end portion of said framework and aligned with one end of said absorber plate to admit cool air simultaneously into both of said air passages, and said air outlet means comprises outlet aperture means in said support plate adjacent the opposite end portion of said framework and aligned with the opposite end of said absorber plate to discharge heated air simultaneously from both of said air passages.

9. The assembly of claim 8 further characterized in that said inlet and outlet aperture means comprise elongated slots extending partially across said support plate, and said absorber plate has marginal end portions extending perpendicularly from the plane of the absorber plate into engagement with said support plate across said slots for dividing the inlet and outlet air flow substantially equally between said first and second air passages.

* * * * *